Patented Nov. 17, 1936

2,060,786

UNITED STATES PATENT OFFICE 2,060,786

PROCESS OF PRODUCING ALLOPRENE-RAYON AND PRODUCTS THEREOF

Rudolph S. Bley, Elizabethton, Tenn., assignor to North American Rayon Corporation, New York, N. Y., a corporation of Delaware No Drawing. Application October 8, 1934, Serial No. 747,399

9 Claims. (Cl. 106—40)

The present invention relates to a process of incorporating finely divided, chlorinated rubber into cellulosic spinning solutions to produce therefrom by extrusion rubber-bearing, cellulosic products, such as filaments, yarns, ribbons, films, etc.

One object of my invention has to do with the incorporation of a special type of chlorinated rubber, the so-called "alloprene", into cellulosic spinning solutions, such as viscose and cuprammonium cellulose.

Another object of this invention relates to the use of "alloprene", dissolved in a suitable organic solvent, in combination with cellulosic solutions.

A third object of my invention has to do with the incorporation of "alloprene", in combination with a suitable vulcanizing agent, into cellulosic solutions of the type set forth above.

Other objects of my invention will become apparent to those skilled in the art after a study of the following specification.

I am well aware that it has, heretofore, been proposed to incorporate rubber and rubber latex into cellulosic solutions to produce rubber-bearing products therefrom. (Vide, French Patent No. 403,264 to Gebauer; French Patent No. 595,208 to Le Play; British Patent 343,617 to Suter; German Patent 262,552 to Pose; U. S. Patent 1,875,185 to Stoeckly; U. S. Patent 1,797,249 to Truesdale, and U. S. Patent 1,934,711 to Higgins, etc.) However, it has been found that ordinary rubber and rubber latex, incorporated into alkaline spinning solutions, are attacked not only by alkalis but by the strongly acid spinning baths into which they are extruded. Thus, it is impossible to obtain satisfactory products with such ordinary rubbers, even if they have previously been vulcanized. Unexpectedly, I have found that these deficiencies of ordinary rubber products can be overcome by using a special, chlorinated rubber in combination with cellulosic spinning solutions. This chlorinated rubber, called "alloprene", is a white, fibrous material containing about 65 to 66% of chlorine. It has a composition corresponding approximately to the formula $C_{10}H_{13}Cl_{17}$, the chlorine being introduced into the rubber molecule both by addition and substitution. "Alloprene" is remarkably resistant to attack by acids and alkalis at ordinary or higher temperatures. Concentrated nitric acid has practically no effect on this chlorinated rubber at temperatures up to 80–90° C., and it remains unchanged after boiling with 40% caustic soda solution for several hours. "Alloprene" is not attacked by hydrochloric acid at all concentrations at temperatures up to 100° C. Even sulphuric acid of 98% strength does not discolor "alloprene" at ordinary temperatures after several days' contact. Furthermore, it is equally resistant to aqueous solutions of oxidizing agents, such as hypochlorites, permanganates and bichromates as well as to corrosive gases, such as oxygen, chlorine and sulphur dioxide. "Alloprene" is non-inflammable and carbonizes without burning or fusing when exposed to a naked flame. It is insoluble in cold or hot water, alcohols or white spirit. Yet, "alloprene" is soluble in a number of organic solvents, such as hydrocarbons, chlorinated hydrocarbons, vegetable oils, etc., forming therewith true or colloidal solutions. I have also found that it may be efficiently dissolved by tetrahydro-naphthol esters, the naphthol compound simultaneously acting as antioxidant. "Alloprene" may also be used in combination with plasticizers, for example, dibutylphthalate, butyl oleate, natural and artificial resins, etc. This chlorinated rubber may be run through colloidal mills to form extremely fine rubber particles which, subsequently, are dispersed in cellulosic solutions of the type set forth above. Instead of grinding "alloprene" to fineness, it may be first dissolved in a suitable solvent and the solution emulsified with cellulosic solutions with or without additional emulsifying agents. After extrusion into conventional spinning baths or after the liquid phases of cellulose esters and ethers have been evaporated, the finished products display a low lustre. Suitable plasticizers or pigments may be admixed to the "alloprene" solvent to modify the chemical and physical characteristics of the cellulose products. Vulcanizing agents, such as sulphur, selenium, sulphur dichloride, m-dinitrobenzene, di- and triphenylguanidine, tetramethylthiuram, piperidine derivatives, etc., may be finely divided or dissolved in the rubber-bearing spinning solutions to form, after conventional vulcanization, modified products.

Yarns, consisting of "alloprene"-cellulose, may be woven into fabrics and used in the manufacture of tires, rubber hose, filtering cloths, stockings, surgical bandages, insulating materials, etc. Since "alloprene" is a non-conductor of electricity and is non-hygroscopic, "alloprene"-cellulose may advantageously be used to cover electric wires, conductors, etc. "Alloprene"-cellulose films may be used as backing for non-inflammable, photographic films. Instead of extruding "alloprene"-cellulose solutions into spinning baths, they may be used for molding various articles, such as vessels, tubes, thermos bottles, especially in view of the fact that "alloprene" has a low thermal conductivity.

Example 1

About 0.5 to 20% of finely divided "alloprene" is added to a conventional, cellulosic spinning solution, such as viscose, cuprammonium cellulose. After thoroughly mixing the ingredients of the compositions, the solution is spun into conventional setting baths. Suitable vulcanizing agents may be added to the cellulosic solutions. The finished products, such as filaments, yarns, ribbons, films, etc., may then be vulcanized. It is to be noted that the percentages of "alloprene" are based upon the cellulose content of the spinning solutions.

Example 2

"Alloprene" is first dissolved in a suitable solvent, such as hydrocarbons, chlorinated hydrocarbons, vegetable oils, tetrahydro-naphthol esters, etc. Enough of this solution is added to the spinning solutions, set forth above, that the finished products contain about 0.5 to 20% of "alloprene" particles. Suitable plasticizers, pigments and vulcanizing may be dissolved or dispersed in the "alloprene" solvent prior to its distribution in the spinning solutions. The "alloprene"-cellulose solutions may be extruded or molded in conventional manner.

I wish to emphasize that the aforementioned ingredients and percentages are merely illustrative, since smaller or larger amounts of "alloprene" may be incorporated into the spinning solutions without deleteriously affecting the finished products. Modifications of my process will readily be recognized by those skilled in the art without departing from the spirit and scope of my invention, and I desire to include all of these modifications falling within the scope of the appended claims.

I claim:

1. A spinning solution for the production of cellulosic products comprising a solution of the group consisting of viscose, and cuprammonium cellulose, and "alloprene".

2. A spinning solution for the production of cellulosic products comprising a solution of the group consisting of viscose, and cuprammonium cellulose, and "alloprene", said "alloprene" being dissolved in an organic solvent.

3. A spinning solution for the production of cellulosic products comprising a solution of the group consisting of viscose, and cuprammonium cellulose, and about 0.5 to 20% of "alloprene".

4. A spinning solution for the production of cellulosic products comprising a solution of the group consisting of viscose, and cuprammonium cellulose, "alloprene", and a vulcanizing agent.

5. A spinning solution for the production of cellulosic products comprising a solution of the group consisting of viscose, and cuprammonium cellulose, and about 0.5 to 20% of "alloprene", said "alloprene" being dissolved in an organic solvent.

6. A spinning solution for the production of cellulosic products comprising a solution of the group consisting of viscose, and cuprammonium cellulose, a vulcanizing agent and about 0.5 to 20% of "alloprene".

7. A spinning solution for the production of cellulosic products comprising a solution of the group consisting of viscose, and cuprammonium cellulose, a vulcanizing agent, about 0.5 to 20% of "alloprene" and an "alloprene"-solvent.

8. A spinning solution for the production of cellulosic products comprising a solution of the group consisting of viscose, and cuprammonium cellulose, "alloprene" and a tetrahydro-naphthol ester.

9. Regenerated cellulose containing finely divided "alloprene", said "alloprene" having approximately the formula $C_{10}H_{13}Cl_{17}$, being a white fibrous material, substantially resistant to alkalis, sulphuric acid and oxidizing agents, non-inflammable and insoluble in hot or cold water and alcohols.

RUDOLPH S. BLEY.